(12) United States Patent
Judge

(10) Patent No.: US 7,854,594 B2
(45) Date of Patent: Dec. 21, 2010

(54) SEGMENTED WIND TURBINE BLADE

(75) Inventor: Paul William Judge, Lyman, SC (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 12/431,281

(22) Filed: Apr. 28, 2009

(65) Prior Publication Data

US 2010/0143143 A1   Jun. 10, 2010

(51) Int. Cl.
*B64C 11/26* (2006.01)
(52) U.S. Cl. .............................. 416/226; 416/233
(58) Field of Classification Search ............... 416/226, 416/232, 233
See application file for complete search history.

(56) References Cited

U.S. PATENT DOCUMENTS 4,130,380 A * 12/1978 Kaiser .................... 416/197 A
7,427,189 B2   9/2008 Eyb 7,470,114 B2   12/2008 Bonnet
2008/0181781 A1   7/2008 Livingston et al.

FOREIGN PATENT DOCUMENTS

| WO | WO 01/46582 | 6/2001 |
|---|---|---|
| WO | WO 2005/064156 | 7/2005 |
| WO | WO 2009130467 A2 * | 10/2009 |
| WO | WO 2009135902 A2 * | 11/2009 |

\* cited by examiner

*Primary Examiner*—Richard Edgar
(74) *Attorney, Agent, or Firm*—Dority & Manning, P.A.

(57) ABSTRACT

A rotor blade for a wind turbine includes a plurality of individual blade segments, with each blade segment defining an internal passage extending between the longitudinal ends of the blade segment. A rigid spar member extends longitudinally through the internal passages of the individual blade segments such that the blade segments are aligned and connected end-to-end on said spar member to define a complete rotor blade from a root to a blade tip. The spar member has a cross-sectional profile that is keyed to the cross-sectional profile of the internal passage in the blade segments. The spar member includes oppositely facing spar caps that engage against the inside surfaces of the blade segments within the internal passages.

16 Claims, 4 Drawing Sheets

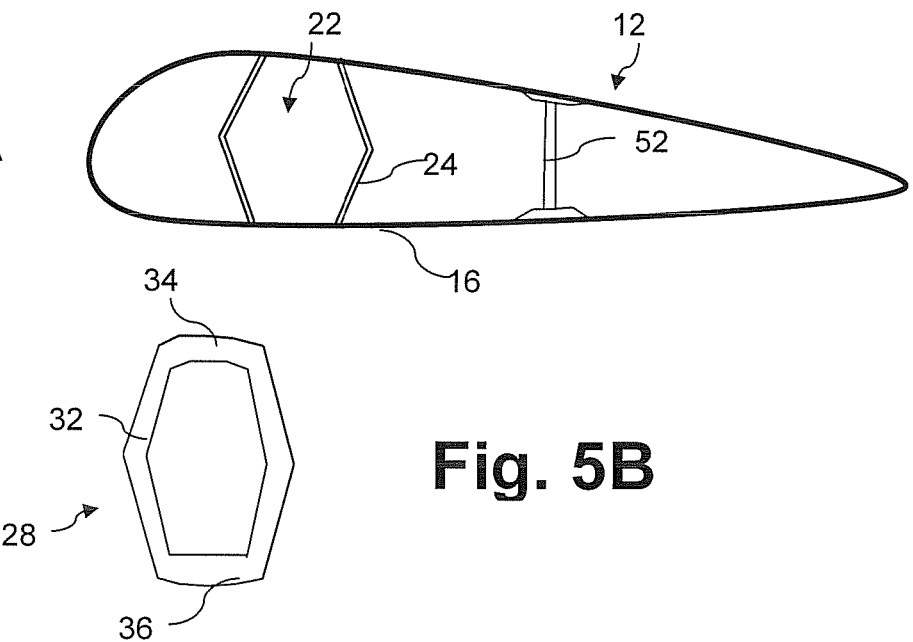
Fig. 5A
Fig. 5B
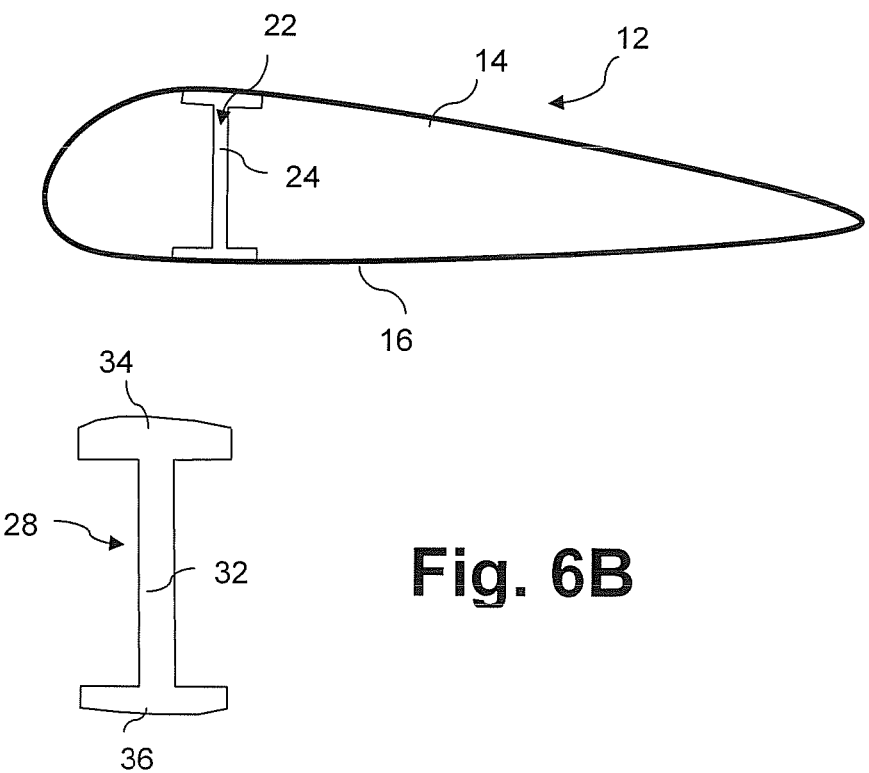
Fig. 6A
Fig. 6B

SEGMENTED WIND TURBINE BLADE

FIELD OF THE INVENTION

The present invention relates generally to wind turbine rotor blades, and more particularly to a segmented wind turbine rotor blade.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components, spar caps, and one or more shear webs. The skin, typically manufactured from layers of fiber composite and a lightweight core material, forms the exterior aerodynamic foil shape of the rotor blade. The spar caps provide increased rotor blade strength by integrating one or more structural elements running along the length of the rotor blade on both interior sides of the rotor blade. Shear webs are structural beam-like components running essentially perpendicular between the top and bottom spar caps and extending across the interior portion of the rotor blade between the outer skins. Spar caps have typically been constructed from glass fiber reinforced composites, though some larger blades may include spar caps constructed from carbon fiber reinforced composites.

The size, shape, and weight of rotor blades are factors that contribute to energy efficiencies of wind turbines. An increase in rotor blade size increases the energy production of a wind turbine, while a decrease in weight also furthers the efficiency of a wind turbine. Furthermore, as rotor blade sizes grow, extra attention needs to be given to the structural integrity of the rotor blades. Presently, large commercial wind turbines are capable of generating between about 1.5 to 5.0 megawatts of power. These larger wind turbines may have rotor blade assemblies larger than 90 meters in diameter. Additionally, advances in rotor blade shape encourage the manufacture of a forward swept-shaped rotor blade having a general arcuate contour from the base to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

As the size of wind turbines increases, particularly the size of the rotor blades, so do the respective costs of manufacturing, transporting, and assembly of the wind turbines. The economic benefits of increased wind turbine sizes must be weighed against these factors. For example, the costs of preforming, transporting, and erecting a wind turbine having rotor blades in the range of 90 meters may significantly impact the economic advantage of a larger wind turbine.

Accordingly, there is a need for a wind turbine rotor blade design that is particularly adaptable for larger wind turbines, and which minimizes the associated transportation and assembly costs of the wind turbine without sacrificing the structural rigidity and energy efficiencies of the wind turbine.

BRIEF DESCRIPTION OF THE INVENTION

The present invention provides an improved wind turbine rotor blade design that addresses the considerations discussed above. Additional aspects and advantages of the invention may be set forth in part in the following description, or may be obvious from the description, or may be learned through practice of the invention.

In accordance with aspects of the invention, a rotor blade for a wind turbine includes a plurality of individual blade segments. Each of the blade segments includes an internal passage extending longitudinally from a first end to a second end of the blade segment, the passage having a keyed cross-sectional profile. A rigid spar member extends longitudinally through the internal passages of the blade segments such that the plurality of blade segments are aligned and connected end to end on the spar member so as to define a complete rotor blade from a root that connects to a rotor hub to a blade tip. The spar member further defines oppositely facing spar caps that engage against inside surfaces of the blade segments within the internal passages. The spar member has a cross-sectional profile corresponding to the keyed cross-sectional profile of the internal passages. Thus, the cross-sectional profiles of the spar member and internal passages of the blade segments are keyed to each other.

It should be appreciated that the present invention also encompasses a rotor blade kit for forming a complete rotor blade for use on a wind turbine. The kit may include a plurality of individual blade segments, with each of the blade segments having an internal passage with a keyed cross-sectional profile extending longitudinally from a first end to a second end of the blade segment. The kit includes a rigid spar member having oppositely facing spar caps, the spar member having a cross-sectional profile corresponding to the keyed cross-sectional profile of the internal passages through the blade segments. To assemble the rotor blade, the blade segments are slid onto the spar member in an ordered sequence with the spar caps engaging against inside surfaces of the upper and lower shell components of the blade segments within the internal passages to define a complete rotor blade from a root that connects to a rotor hub to a rotor blade tip.

It should further be appreciated that the invention encompasses the individual blade segments as described herein, whereby a plurality of the blade segments are mountable onto a spar member to define a complete rotor blade.

BRIEF DESCRIPTION OF THE DRAWINGS

The invention, in accordance with preferred and exemplary embodiments, together with further aspects and advantages thereof, is more particularly described in the following detailed description taken in conjunction with the accompanying drawings in which:

FIGS. 5A and 5B are cross-sectional views of an alternative embodiment of a blade segment with keyed internal passage and correspondingly configured spar member;

FIGS. 6A and 6B are cross-sectional views of still another embodiment of a segmented blade with keyed internal passage and correspondingly configured spar member;

DETAILED DESCRIPTION

Figure 1:
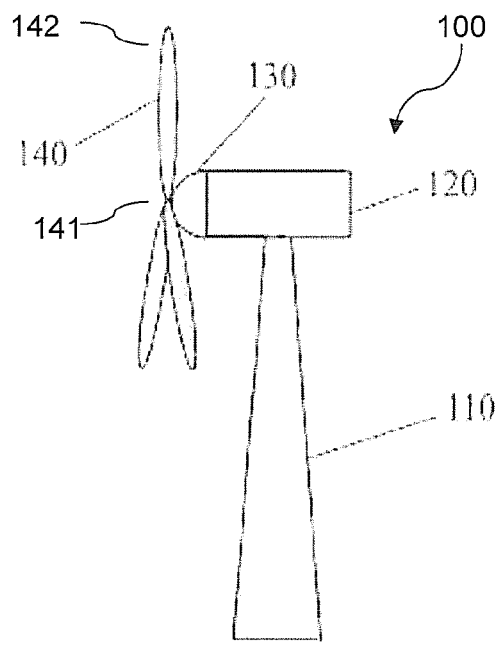
FIG. 1 is a schematic view of a conventional wind turbine.

Reference is now made to particular embodiments of the invention, one or more examples of which are illustrated in the drawings. Each embodiment is presented by way of explanation of aspects of the invention, and should not be taken as a limitation of the invention. For example, features illustrated or described with respect to one embodiment may be used with another embodiment to yield still further embodiment. It is intended that the present invention include these and other modifications or variations made to the embodiments described herein.

FIG. 1 is a schematic view of a conventional wind turbine 100. The wind turbine 100 includes a tower 110 with a machine nacelle 120 mounted at the top of the tower. A hub 130 having three rotor blades 140 is mounted to a lateral end of the machine nacelle 120.

A typical configuration of conventional rotor blades 140 includes a root section 141 which is used to mount the rotor blade 140 to the hub 130. Opposite to the root section 141, a tip end 142 of the rotor blade 140 is disposed. The body section of the rotor blade 140 extending between the root section 141 and the tip end 142 typically includes a first shell component and a second shell component running longitudinally between the root section 141 and tip end 142. A spar cap extends along substantially the full longitudinal length of each of the shell components and is bonded to an inner skin or surface of the shell components. A longitudinally extending internal shear web runs between the shell components and is adhered to the spar caps at a generally perpendicular orientation. The spar caps and internal shear web give the turbine blade its structural rigidity.

Figure 2:
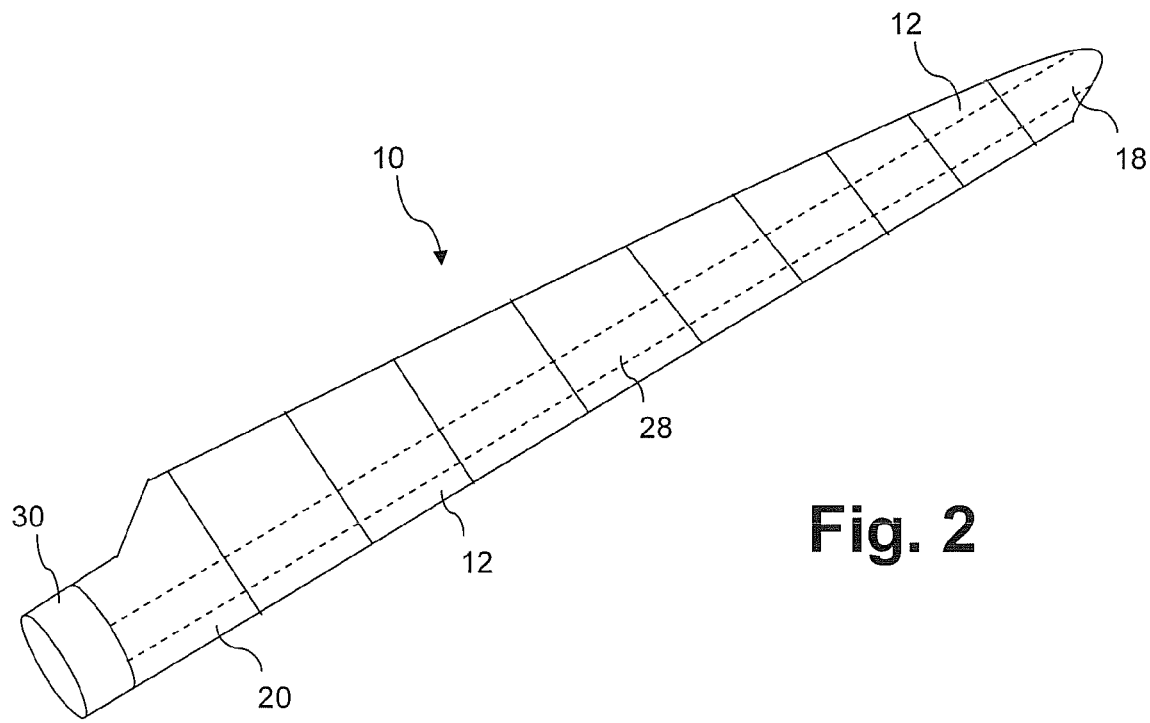
FIG. 2 is a view of a segmented wind turbine blade in accordance with aspects of the invention.

Referring to FIG. 2, a segmented turbine blade 10 in accordance with aspects of the invention is illustrated. The segmented turbine blade 10 includes a plurality of individual blade segments 12 aligned in an end-to-end order from a tip blade segment 18 to a root blade segment 20. Each of the individual blade segments 12 is uniquely configured so that the plurality of segments 12 define a complete blade 10 having the designed blade profile, length, and other desired characteristics. The complete segmented blade 10 may have a swept shape giving it a curved contour running from the distal end to the proximal end of the blade 10. In an alternative embodiment, the segmented rotor blade 10 may have a non-swept shape.

The blade segments 10 may include any manner of internal webs that define the internal passage, or other support webs between upper and lower shell components of the blade segments.

The longitudinal end faces of the individual blade segments 10 may have a profile so as to interlock with the end face of an adjacent blade segment. For example, the mating end faces of adjacent blade segments may have overlapping edges, or male-female interlocking members, or other suitable structure that ensures a positive engagement and alignment of the blade segments on the spar member.

Figure 3:
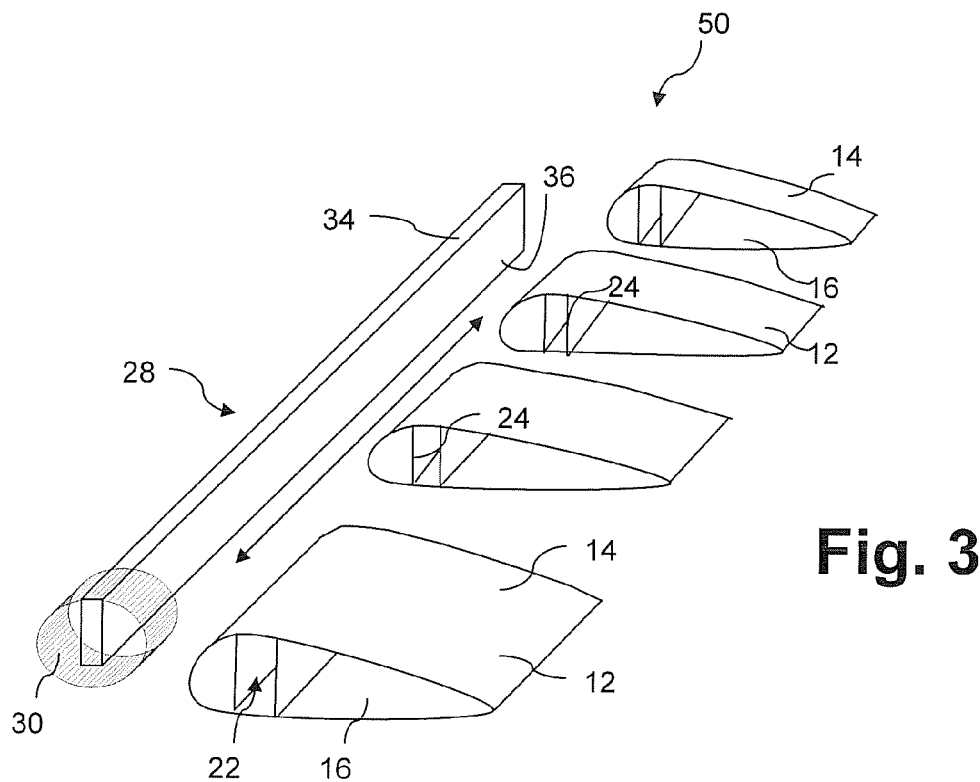
FIG. 3 is a partial component view of an embodiment of a segmented wind turbine blade.

Referring for example to FIG. 3, each of the individual blade segments 12 includes an internal longitudinally extending passage 22. This passage 22 extends from a first longitudinal end to a second longitudinal end of each blade segment 12 and has a particular cross-sectional profile. The internal passage may be defined by any configuration of internal web members 24.

A rigid spar member 28 extends longitudinally through the internal passages 22 of the plurality of blade segments 12. The individual blade segments 12 are connected together in an end-to-end configuration on the spar member to define the complete segmented blade 10 depicted in FIG. 2. The cross-sectional profile of the spar member 28 and individual internal passages 22 are keyed to each other with a particular profile that inhibits rotation of the blade segments 12 relative to the spar member 28. The spar member 28 includes a root ring 30 for attaching the completed blade to a rotor hub.

The spar member 28 may tale on various shapes and configurations. In a particular embodiment, the spar member is a hollow box beam structure, with the internal passage through the blade segments having a corresponding keyed profile. For example, the spar member may have a hollow square or rectangular configuration, with the spar caps defined by opposite sides of the box beam structure. In alternate embodiments, the spar member may have a hollow beam structure with concave or convex walls extending between the spar caps. In still other embodiments, the spar member may be a unitary web structure having, for example, an I-beam or other similar cross-sectional profile having a center web with spar caps extending transversely from opposite longitudinal ends of the center web. With this embodiment, the internal passages through the blade segments would have a correspondingly shaped cross-sectional profile.

The blade segments 10 may be connected or affixed to the spar member 28 by any conventional attaching means. In a particular embodiment, the blade segments may be bonded to the spar member.

Figure 4A:
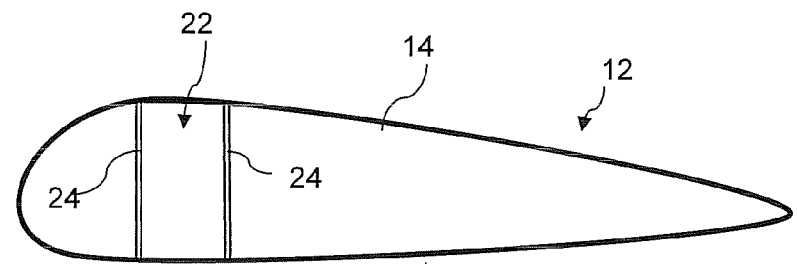
FIGS. 4A and 4B are cross-sectional views of an embodiment of a blade segment with keyed internal passage and correspondingly configured spar member.
Figure 4B:
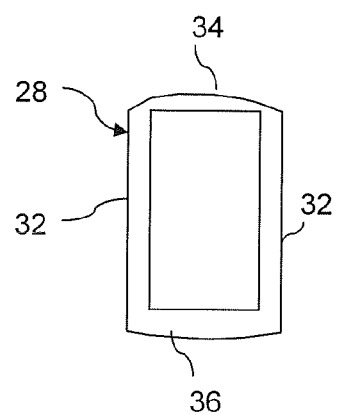

Referring to FIGS. 3, 4A and 4B, each of the individual blade segments 12 may be formed from a first shell component 14 and a second shell component 16. These shell components may be individually formed and joined together at the leading and trailing edges of the turbine blade. The individual shell components 14, 16 may each include an inner and outer skin, and may be constructed, for example, from a dry fibrous material. In addition, each of the shells 14, 16 may include a core material sandwiched between the inner and outer skins. This core material may be, for example, a lightweight material, such as balsa wood, extruded polystyrene foam, or the like, as is known in the art. The internal webs 24 define the internal passage 22 having a certain keyed profile that corresponds or matches the cross-sectional profile of the spar member 28. The webs 24 may be formed of any suitable material conventionally used as internal shear webs for wind turbine blades. The webs 24 may be adhered to the inner skins of the shell components, 14, 16 using any suitable adhesive material or bonding method. The webs 24 may be attached directly to the inner skin surfaces of the shell components 14, 16, or may be attached to a separate web that is adhered to the inner skin surfaces for added support and rigidity. The configuration of internal webs 24 defines the cross-sectional profile for the internal passage 22 that is keyed to the cross-sectional profile of the spar member 28.

In the embodiment illustrated in FIGS. 3, 4A, and 4B, the internal passageway 22 has a generally box-like cross-sectional profile and the spar member 28 has a generally hollow box beam structure with a corresponding keyed cross-sectional profile. Referring for example to FIG. 4B, the spar member 28 includes shear webs 32 between an upper spar cap 34 and a lower spar cap 36. The spar caps 34, 36 have a shape and curvature that essentially matches the shape and curvature of the internal skins of the respective shell components 14, 16, or any additional internal web adhered to the inner skin surfaces. With this unique configuration, the individual blade segments 12 are readily slidable onto the spar member 28 to define the completed turbine blade 10. In the assembly process, the individual blade segments 12 can be bonded to the spar member 28 at the interface of the spar caps 34, 36 and inner skin surfaces of the shell components 14, 16. The keyed cross-sectional profiles further ensure structural rigidity of the blade and reduce torsion between the respective blade segments 12.

The spar member 28 with integral spar caps 34, 36 may be formed of any suitable material. For example, the spar cap components 34, 36 may be formed of a carbon fiber reinforced matrix or a glass fiber reinforced polymer, or other strong, light-weight material. The shear web components 32 may be formed from the same or a different material.

The keyed cross-sectional profiles of the internal passages 22 in the blade segments 12 and the respective spar members 28 may take on various profiles. For example, in the embodiment of FIGS. 5A and 5B, the internal webs 24 define an internal passage 22 having walls that are essentially convex in that they bow outwardly. The webs 24 may, in an alternate embodiment, define a profile for the internal passage 22 having concave walls that bow inwardly towards each other. The spar member 28 of FIG. 5B has a corresponding profile and is formed as a generally hollow beam member having shear webs 32 and spar caps 34, 36 with a curvature so as to bond to the inner skin surfaces of the shell components 14, 16, within the internal passage 22.

The embodiment of FIG. 5A illustrates inclusion of an additional web or brace 52 between the shell components 14, 16. It should be appreciated that any number or configuration of additional internal braces or webs between the shell components 14, 16, of an individual blade segment 12 is within the scope and spirit of the invention.

In the embodiment of FIGS. 6A and 6B, the internal passage 22 in the blade segment 12 has an essentially I-beam configuration defined by the internal webs 24. The spar member 28 of FIG. 6B has a correspondingly keyed I-beam profile. In this particular embodiment, the spar member 28 is a solid, unitary member, as compared to the hollow beam configurations of FIGS. 4B and 5B. As with the other embodiments, the spar caps 34, 36 have a curvature and profile so as to correspond to the curvature and profile of the inner skin surfaces of the shell components 14, 16 within the internal passage 22.

In the various embodiments illustrated in the figures, the cross-sectional profiles of the internal passages 22 is completely keyed to the cross-sectional profiles of the respective spar members 28 around the complete circumference of the profiles. In other words, the profiles match each other around their entire circumference. It should, however, be appreciated that this is not a requirement. For example, the generally rectangular profile of the internal passage 22 in the embodiment of FIG. 6A may be keyed with an I-beam spar member 28 as illustrated in FIG. 6B. This configuration is still considered as "keyed" in that the I-beam spar member 28 has spar caps 34, 36 with a curvature and profile so that the blade segments 12 slide onto the spar member 28 with a bonding engagement surface for the spar caps 34, 36 defined between the internal webs 24 within the passage 22, and the blade segment cannot rotate on the spar member 28. In other words, the keyed profiles ensure that a desired relative position of the blade segments 12 on the spar member 28 is ensured.

Figure 7:
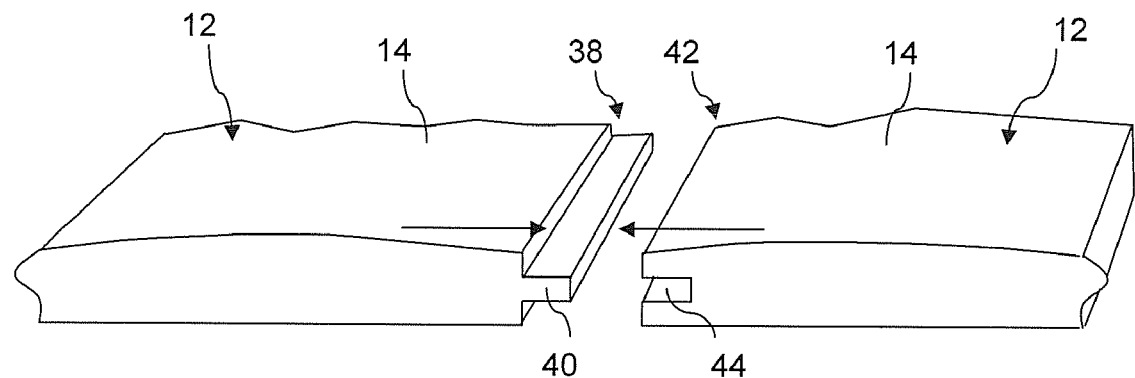
FIG. 7 is a view of interlocking end faces of adjacent blade segments.
Figure 8:
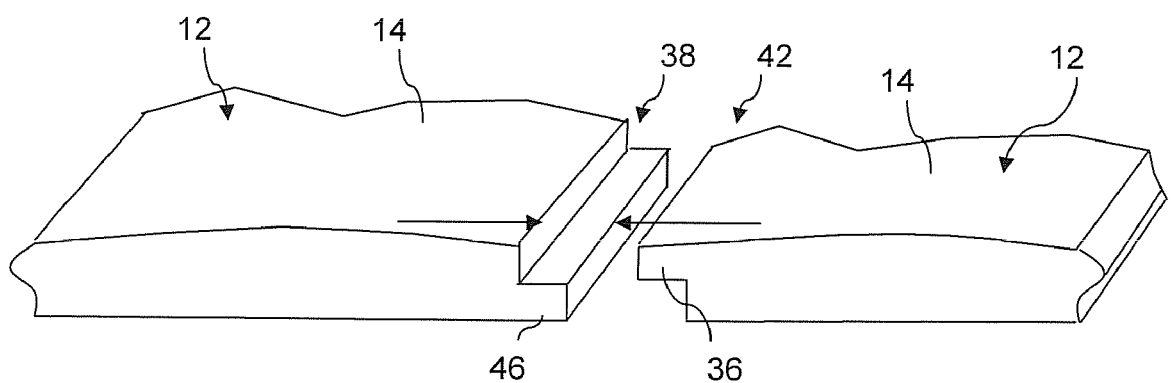
FIG. 8 is a view of an alternative embodiment of interlocking end faces of adjacent blade segments.

Referring to FIGS. 7 and 8, in particular embodiments, the longitudinal end faces 38, 42, of adjacent blade segments 12 may have an interlocking configuration to ensure positive engagement of the blade segments 12 on the spar member 28. For example, in the embodiment of FIG. 7, the longitudinal end face 38 includes a male protrusion 40 that fits into a female recess 44 defined in the end face 42 of the adjacent blade segment 12. Any type of conventional dovetail configuration may be utilized in this regard. In the embodiment of FIG. 8, the interlocking configuration is defined by a lap splice joint between the edge 46 on end face 38 and the edge 48 of the end face of the adjacent segment 12. The adjacent blade segments 12 may be bonded together at the interlocking configuration of their respective end faces.

It should be readily appreciated that the present invention encompasses the individual turbine blade segments illustrated and described herein as stand-alone components, wherein a plurality of the blade segments 12 are mountable onto a spar member to define a complete turbine blade.

Referring to FIG. 3, it should also be appreciated that the present invention encompasses a kit 50 that includes the plurality of components necessary for subsequent assembly into a complete blade 10 as illustrated in FIG. 2. For example, the kit 50 may include a plurality of the individual blade segments 12, spar cap 28 with root ring 30, and any other components necessary to form the complete blade 10 as depicted in FIG. 2.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A rotor blade for a wind turbine, comprising:
a plurality of individual blade segments, each said blade segment comprising first and second shell components joined at leading and trailing edges of said blade segment;
each of said plurality of blade segments comprising an internal passage extending longitudinally from a first end to a second end of each of said blade segments, said passage having a keyed cross-sectional profile along the length thereof between said first end and said second end;
a rigid spar member extending longitudinally through said internal passages of each of said blade segments such that said plurality of blade segments are aligned and connected end to end on said spar member and define a complete rotor blade from a root that connects to a rotor hub to a blade tip;
said spar member further comprising oppositely facing spar caps engaged against inside surfaces of said blade segments within said internal passages;
said spar member having a cross-sectional profile corresponding to said keyed cross-sectional profile of said internal passages; and,
said internal passages defined by internal webs that extend between said first and second shell components along the length of said internal passage.

2. The rotor blade as in claim 1, wherein said spar member comprises a hollow box beam structure, said spar caps defined by opposite sides of said box beam structure, and said internal passages of each of said blade segments having a corresponding box shaped cross-sectional profile.

3. The rotor blade as in claim 1, wherein said spar member comprises a hollow beam member having concave or convex walls extending between said spar caps, and said internal passages of each of said blade segments having a correspondingly shaped cross-sectional profile.

4. The rotor blade as in claim 1, wherein said spar member comprises a center web with said spar caps extending transversely from opposite longitudinal ends of said center web, and said internal passages of each of said blade segments having a correspondingly shaped cross-sectional profile.

5. The rotor blade as in claim 4, wherein said spar member and said internal passages of each of said blade segments comprise an I-beam cross-sectional profile.

6. The rotor blade as in claim 1, wherein said plurality of blade segments are bonded to said spar member.

7. The rotor blade as in claim 6, further comprising an interlocking joint between end faces of adjacent said blade segments.

8. A rotor blade kit for forming a rotor blade used on a wind turbine, comprising:
   a plurality of individual blade segments, each said blade segment comprising first and second shell components joined at leading and trailing edges of said blade segment;
   each of said blade segments comprising an internal passage extending longitudinally from a first end to a second end of each of said blade segments, said passage having a keyed cross-sectional profile along the length thereof between said first end and said second end;
   said internal passages defined by internal webs that extend between said first and second shell components along the length of said internal passage;
   a rigid spar member comprising oppositely facing spar caps, said spar member having a cross-sectional profile corresponding to said keyed cross-sectional profile of said internal passages of each of said blade segments; and
   wherein said plurality of blade segments are slidable onto said spar member in an ordered sequence with said spar caps engaging against inside surfaces of each of said blade segments within said internal passages to define a complete rotor blade from a root that connects to a rotor hub to a rotor blade tip.

9. The rotor blade kit as in claim 8, wherein said spar member comprises a hollow box beam structure, said spar caps defined by opposite sides of said box beam structure, and said internal passages of each of said blade segments having a corresponding box shaped cross-sectional profile.

10. The rotor blade kit in claim 8, wherein said spar member comprises a hollow beam member having concave or convex walls extending between said spar caps, and said internal passages of each of said blade segments having a correspondingly shaped cross-sectional profile.

11. The rotor blade kit as in claim 8, wherein said spar member comprises a center web with said spar caps extending transversely from opposite longitudinal ends of said center, and said internal passages of each of said blade segments having a correspondingly shaped cross-sectional profile.

12. The rotor blade kit in claim 8, further comprising an interlocking joint profile defined on end faces of each of said blade segments.

13. An individual blade segment for a wind turbine rotor blade that is formed from a plurality of said individual blade segments aligned end to end on a rigid spar member that extends through said individual blade segments, said individual blade segment comprising a closed skin structure and internal webs extending between opposite sides of said closed skin structure along the length of said blade segment, said internal webs defining an internal passage extending longitudinally between opposite ends of said blade segment, said passage having a keyed cross-sectional profile along the length of said blade segment that matches the cross-sectional profile of the spar member, and an interlocking joint profile defined on longitudinal end faces of said skin structure so that adjacent blade segments interlock on the spar member.

14. The blade segment as in claim 13, wherein said internal passage comprises box-shaped cross-sectional profile.

15. The blade segment as in claim 13, wherein said internal passage comprises concave or convex walls extending between said skin structure.

16. The blade segment as in claim 13, wherein said internal passage comprises an I-beam cross-sectional profile.

* * * * *